April 7, 1931.    H. W. PLEISTER    1,799,245

HAMMER DRIVE BOLT ANCHOR, BRIDLE RING, AND CABLE CLAMP

Filed July 21, 1928

INVENTOR.
Henry W. Pleister
BY Alander Johnson
ATTORNEY.

Patented Apr. 7, 1931

1,799,245

UNITED STATES PATENT OFFICE

HENRY W. PLEISTER, OF WESTFIELD, NEW JERSEY, ASSIGNOR TO HENRY B. NEWHALL CORPORATION, OF GARWOOD, NEW JERSEY, A CORPORATION OF NEW JERSEY

HAMMER DRIVE BOLT ANCHOR, BRIDLE RING, AND CABLE CLAMP

Application filed July 21, 1928. Serial No. 294,379.

My invention relates to the combination of a hammer drive bolt anchor and a bridle ring, and also to a bridle ring as a separate article of manufacture.

My invention further relates to a cable clamp and means to yieldingly hold it against the surface of a wall or other suitable support.

My invention further relates to a combined hammer drive bolt anchor, cable clamp and bridle ring, in which the bridle ring performs not only its accustomed function of supporting bridle or drop wires, but also acts as a spring to yieldingly press the cable clamp against a wall or other suitable support.

My invention further relates to certain combination, sub-combination, articles of manufacture and details of construction, all of which will be more fully hereinafter described and pointed out in the claims.

In the figures I have shown different embodiments of my invention, the same reference numerals refer to similar parts of the several figures.

Figure 6:
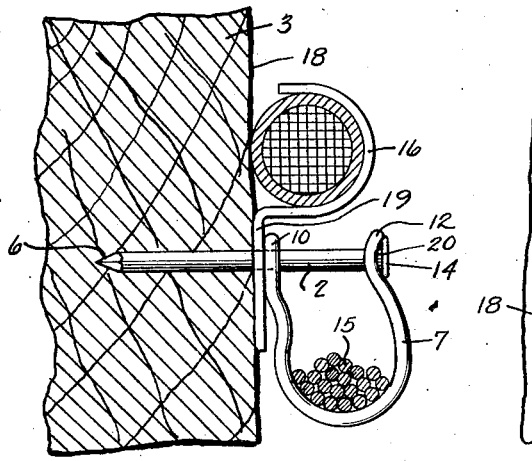
Fig. 6 is a vertical section showing the manner of yieldingly holding a cable clamp against an irregular surface, the expansion shield being omitted in this figure.
Figure 7:
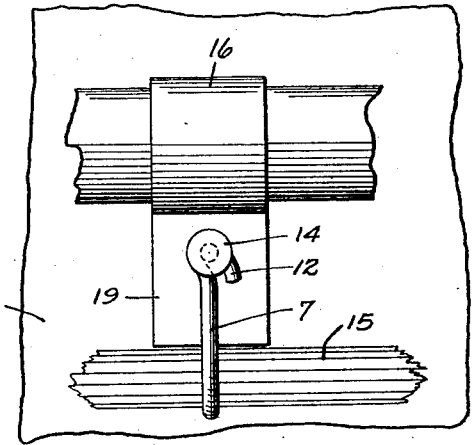
Fig. 7 is a front elevation of Fig. 6.

In my invention I employ a nail 1, or other non-rotating holding member, having an excessively long shank 2. This nail may be driven directly into a support 3 of wood or other similar material, (Fig. 6) but is preferably employed with a nail expansion shield 4, which is mounted in a hole 5, drilled or otherwise formed in a wall 6 of stone, concrete, brick, terra-cotta or similar material into which it is not feasible to drive the point of a nail. This nail is preferably the ordinary wire nail of commerce having a uniform shank 2, the shank being long enough to protrude from the nail expansion shield 4, if employed, or from the wall of wood 3 or other similar material, if an expansion shield is not employed. The distance that the shank 2 will protrude can be readily determined by the depth to which the hole 5 is drilled, so that when the point 6 reaches the end of the hole 5 the shank will protrude to approximately the distance desired. In driving the nail into a wood support 3, the distance of protusion can be determined by the eye, due weight being given to the fact that the nail must be driven in sufficiently to form a firm bond or support for the bridle ring 7, Fig. 2.

Figure 1:
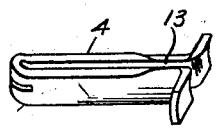
Fig. 1 is a perspective view of a nail expansion shield.
Figures 2, 3:
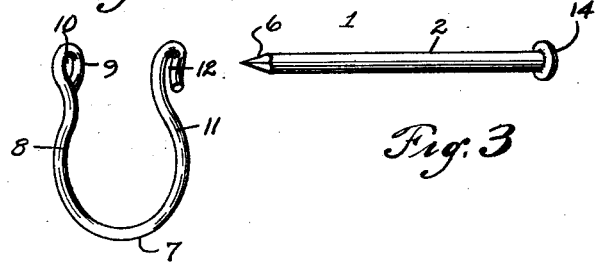
Fig. 2 is a perspective view of the preferred form of bridle ring.
Fig. 3 is a perspective view of a nail, having an excessively long shank for the particular size nail expansion shield with which it is used, such as shown in Fig. 1.

This bridle ring 7 is preferably formed of spring wire, and in the preferred construction shown in Fig. 2 one arm 8 has its end 9 turned back upon itself to form a closed eye 10, the other arm 11 being bent to form a hook 12.

In positioning the bridle ring, the end 6 of the nail 2 is passed through the closed eye 10 of the bridle ring, and thence into the axial bore 13 of the nail expansion 4; blows of a hammer, not shown, upon the head 14 of the nail serve to drive the nail into the expansion and expand it. The distance that the nail will be driven into the expansion is preferably, though not necessarily, determined by the depth of the hole 5. The operator can readily determine the proper distance, after the expansion shield has been expanded, whether or not the end of the nail 6 contacts with the bottom of the hole 5. The different bridle wires or drop wires 15—15 may be then brought over the loose arm 11, when this arm is then lifted by the operator so that the hook 12 can be hooked over the shank 2 of the nail adjacent the head 14. To perform this action the parts are preferably so formed that it is necessary to spring the arms 8 and 11 towards each other, which puts them under tension, the hook 12 being held by yielding pressure against the head 14 of the nail, while the closed eye will bear with yielding pressure against the shield 4 so that vibration will not loosen the bridle ring. Of course, in some cases it may be desirable to hook the hook 12 over the shank 2 of the nail before the bridle or drop wires 15—15 are placed within the bridle ring, requiring them to be later threaded through the bridle ring. Whether the first or the second procedure is followed will depend upon the exigency of the situation where the lineman is using the bridle rings at the time.

The end 11 and open hook 12 are preferably, though not necessarily, bent to form a concave surface 20 to cooperate with the head 14 of the nail 1.

My invention further relates to a cable clamp and means to secure it in position. There are locations in which a cable clamp 16 has to be mounted on a surface 18 of a wall or other suitable support whether formed of wood, masonry, brick or other material, which may be extremely rough and uneven, and it is desirable to have the base 19 of the cable clamp conform to the irregularities of the wall with which it is in contact.

Figure 4:
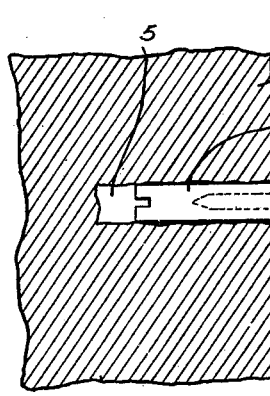
Fig. 4 is a vertical section showing the first step in expanding the shield and in connecting the bridle ring to the excessively long shank of the nail.
Figure 5:
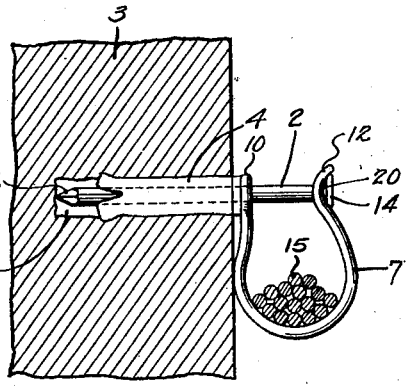
Fig. 5 is a vertical section, similar to Fig. 4, showing the final position of the nail; the nail expansion being expanded and the hook end of the bridle ring being hooked over the excessively long shank of the nail.

I have shown, for example, in Figs. 4 and 5 the cable clamp 16 held by yielding pressure against the irregular surface 18, which happens to be of wood in this figure, though it is of course to be understood that it may be masonry or any other material. This yielding pressure is a spring 7 which performs also the function of a bridle ring and is the same bridle ring previously described at length, and shown in detail in Fig. 2. While I have shown in Fig. 4 the nail being driven directly into the support, because in this figure the support is of wood, it is of course to be understood that in masonry or other similar material a nail expansion shield such as 4 would be employed. Preferably, though not necessarily, the bridle ring 7, if it is to yieldingly hold the cable clamp, such as 16, to a wall or suitable support, may be formed of little heavier spring wire than that required when it is employed simply as a bridle ring, as shown in Figures 2, 4 and 5. Of course, and particularly when it is used in cooperation with a cable clamp, the tension of the bridle ring may be increased by giving one or two additional taps of the hammer, after the hook 12 is hooked over the shank of the nail 2.

Having thus described this invention in connection with illustrative embodiments thereof, to the details of which I do not desire to be limited, what is claimed as new and what is desired to secure by Letters Patent is set forth in the appended claims.

What I claim is:—

1. The combination in a hammer drive bolt anchor of a nail expansion shield, a nail having a shank longer than necessary to expand the shield permitting a portion of the shank to protrude from the shield and a bridle ring formed of a U-shaped loop of wire bent to form resiliently acting portions with one end of the U-shaped loop provided with an eye and the other end provided with a hook to hook over the shank of the nail, both the eye and hook adapted to slidably engage the shank.

2. The combination of a cable clamp, a nail to support it upon a support and provided with a protruding shank, a bridle ring formed of a U-shaped loop of wire bent to form resiliently acting portions, one end of the U-shaped loop provided with an eye and the other portion with a hook to permit the hook to be hooked over the protruding shank of the nail after the bridle or drop wires are mounted in the bridle ring, both the eye and the hook of the U-shaped loop adapted to slidably engage the shank of the nail and be compressed between the head of the nail and the clamp, to yieldingly hold the cable clamp against the wall or other support.

HENRY W. PLEISTER.